United States Patent
Upadhyay et al.

(10) Patent No.: US 8,255,994 B2
(45) Date of Patent: Aug. 28, 2012

(54) DETECTION AND SUPPRESSION OF SHORT MESSAGE SERVICE DENIAL OF SERVICE ATTACKS

(75) Inventors: Piyush Upadhyay, Mission, KS (US); William James Routt, Leawood, KS (US); Patrick David Wilson, Denver, CO (US); Debashis Haldar, Olathe, KS (US); John Chandler Witzgall, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 734 days.

(21) Appl. No.: 12/195,109

(22) Filed: Aug. 20, 2008

(65) Prior Publication Data

US 2010/0050255 A1  Feb. 25, 2010

(51) Int. Cl.
G06F 21/00 (2006.01)
(52) U.S. Cl. ............... 726/22; 726/23; 726/24; 713/153
(58) Field of Classification Search .................. 726/22
See application file for complete search history.

(56) References Cited

U.S. PATENT DOCUMENTS

| | | | |
|---|---|---|---|
| 7,145,875 B2 * | 12/2006 | Allison et al. | 370/230.1 |
| 7,389,537 B1 * | 6/2008 | Callon et al. | 726/22 |
| 7,779,466 B2 * | 8/2010 | Judge et al. | 726/22 |
| 7,787,888 B2 * | 8/2010 | Haran et al. | 455/456.1 |
| 7,921,460 B1 * | 4/2011 | Callon et al. | 726/22 |
| 7,945,234 B2 * | 5/2011 | Lee et al. | 455/343.2 |
| 2002/0012329 A1 * | 1/2002 | Atkinson et al. | 370/330 |
| 2002/0159387 A1 * | 10/2002 | Allison et al. | 370/229 |
| 2003/0083078 A1 * | 5/2003 | Allison et al. | 455/466 |
| 2005/0144467 A1 * | 6/2005 | Yamazaki | 713/189 |
| 2006/0059568 A1 * | 3/2006 | Smith-Mickelson et al. | 726/27 |
| 2006/0121910 A1 * | 6/2006 | Willey et al. | 455/450 |
| 2007/0060100 A1 * | 3/2007 | Watler et al. | 455/406 |
| 2007/0077931 A1 * | 4/2007 | Glinka | 455/445 |
| 2007/0121596 A1 * | 5/2007 | Kurapati et al. | 370/356 |
| 2007/0275741 A1 * | 11/2007 | Bian et al. | 455/466 |
| 2008/0134327 A1 * | 6/2008 | Bharrat et al. | 726/22 |
| 2009/0061863 A1 * | 3/2009 | Huggett et al. | 455/434 |
| 2009/0291630 A1 * | 11/2009 | Dunn et al. | 455/3.01 |

FOREIGN PATENT DOCUMENTS

| | | |
|---|---|---|
| WO | 0133889 A | 5/2001 |
| WO | 02071234 A1 | 9/2002 |
| WO | 2007041157 A1 | 4/2007 |

OTHER PUBLICATIONS

Azim et al., "Exploiting Vulnerabilities and Security Mechanisms in Iternet based SMS capable Cellular Network," Nov. 2007, International Journal of Computer Science and Network Security, vol. 11, pp. 280-285.*

(Continued)

Primary Examiner — Luu Pham

(57) ABSTRACT

A method, system, and medium are provided for suppressing a Short Message Service (SMS) induced Denial of Service (DoS) attack on a telecommunications network. A register is updated to include information relevant to SMS messages that are requested to be communicated by way of a wireless telecommunications network. The register includes information of the location where the target devices of SMS messages are located. The register is utilized to detect an SMS induced DoS attack. A trigger is communicated to an SMS router to enable a DoS mode that restricts the communication of SMS messages. In an exemplary embodiment, only those SMS messages identified as part of the DoS attack are restricted.

18 Claims, 6 Drawing Sheets

OTHER PUBLICATIONS

Enck et al., "Exploiting Open Functionality in SMS-Capable Cellular Networks," ACM, Nov. 2005, pp. 393-403.*

Racic et al., "Exploiting MMS Vulnerabilities to Stealthily Exhaust Mobile Phone's Battery," IEEE, 2006, pp. 1-9.*

Traynor, Patrick, et al., "Mitigating Attacks on Open Functionality in SMS-Capable Cellular Networks," pp. 182-193, Sep. 26, 2006, Pennsylvania State University, University Park, PA.

PCT Search Report mailed Jun. 10, 2009, International Application No. PCT/US2009/053506, 16 pages.

William Enck et al., Exploiting Open Functionality in SMS-Capable Cellular Networks, www.cse.psu.edu/~traynor/papers/smsanalysis.pdf, CCS' 05, Nov. 7-11, 2005, Alexandria, Virginia.

An Analysis of Vulnerabilities in SMS-Capable Cellular Networks, www.smsanalysis.org, Jun. 28, 2008.

PCT—International Preliminary Report on Patentability, mailing date Aug. 1, 2011, 8 pages.

* cited by examiner

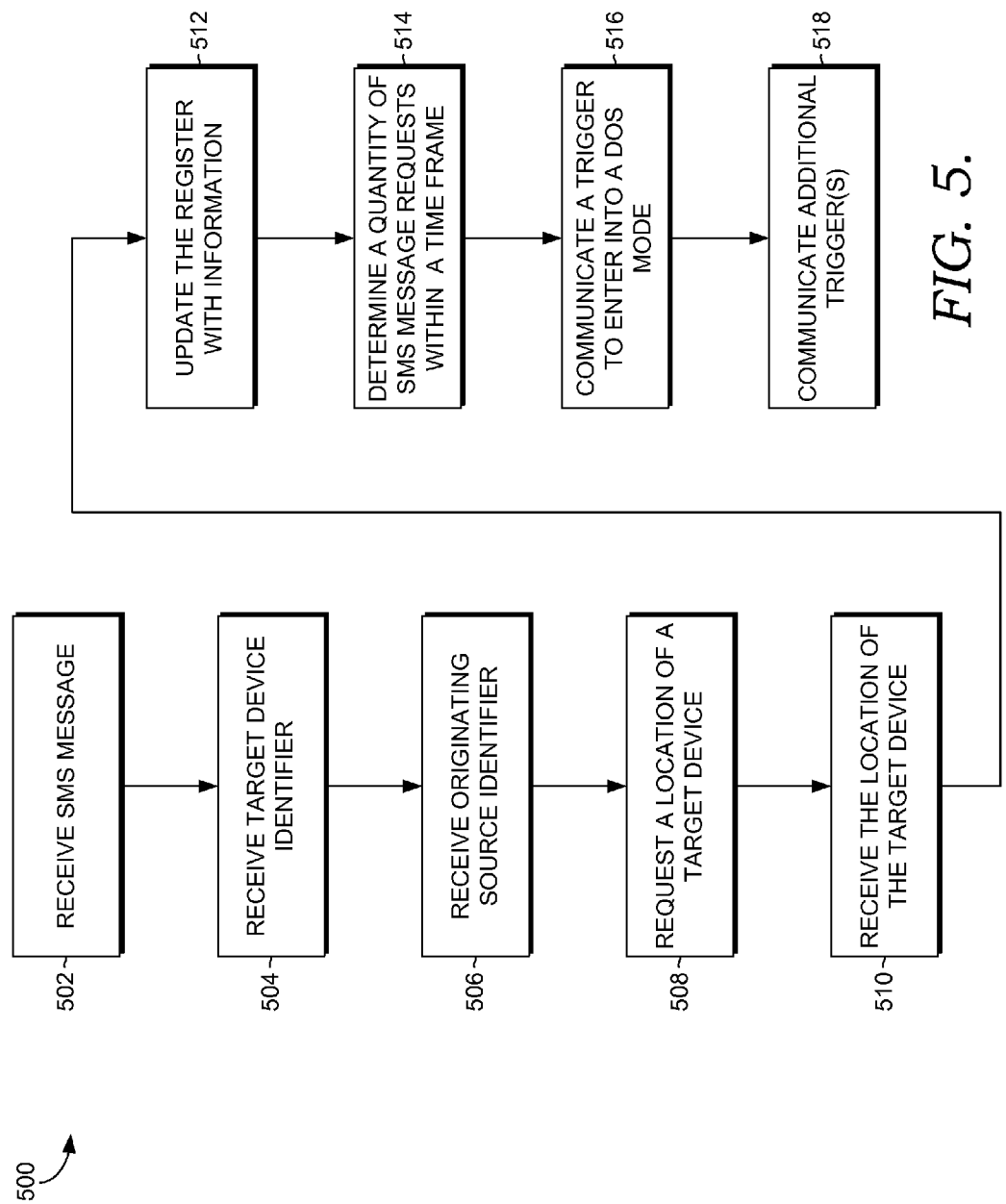

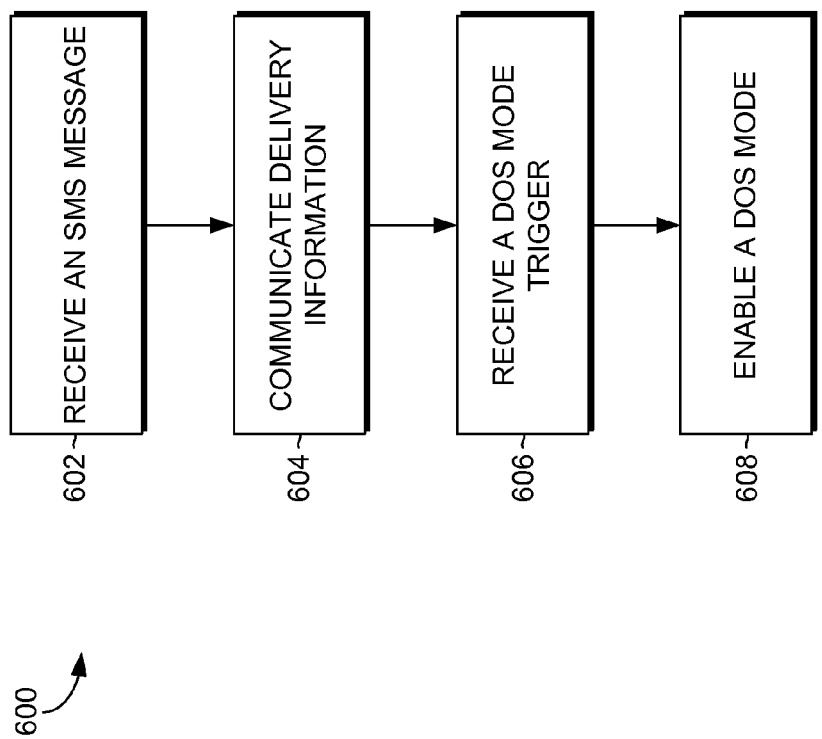

DETECTION AND SUPPRESSION OF SHORT MESSAGE SERVICE DENIAL OF SERVICE ATTACKS

BACKGROUND

A Denial of Service (DoS) attack on a wireless telecommunications network prevents the wireless telecommunications network from performing in a reliable manner. A DoS attack could be accomplished by inundating a targeted geographic location served by a wireless telecommunications network with a large quantity of SMS messages. A large quantity of SMS messages, in a short period of time to a targeted geographic location, can prevent other requests, such as voice call setup requests, from being communicated by way of the wireless telecommunications network.

SUMMARY

Embodiments of the present invention relate to systems, methods and computer-storage media for suppressing a Short Message Service (SMS) induced Denial of Service (DoS) attack on a telecommunications network. A register receives a target device identifier that is associated with an SMS message. The register requests a location of the target device from a Home Location Register. The location of the target device is received. The register is updated to reflect the location of the target device. The quantity of SMS messages requested to be communicated within a predefined time period is determined to identify an SMS induced DoS attack. Upon determining that the quantity of SMS messages requested exceeds a predefined threshold, a trigger is communicated to an SMS router to enable a DoS mode. The DoS mode restricts communication of SMS messages to suppress the detected DoS attack.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 depicts a method of suppressing a Short Message Service induced Denial of Service attack on a telecommunications network in accordance with an embodiment of the present invention; and FIG. 6 depicts a method of suppressing a Short Message Service induced Denial of Service attack on a telecommunications network in accordance with an embodiment of the present invention.

DETAILED DESCRIPTION

Figure 1:
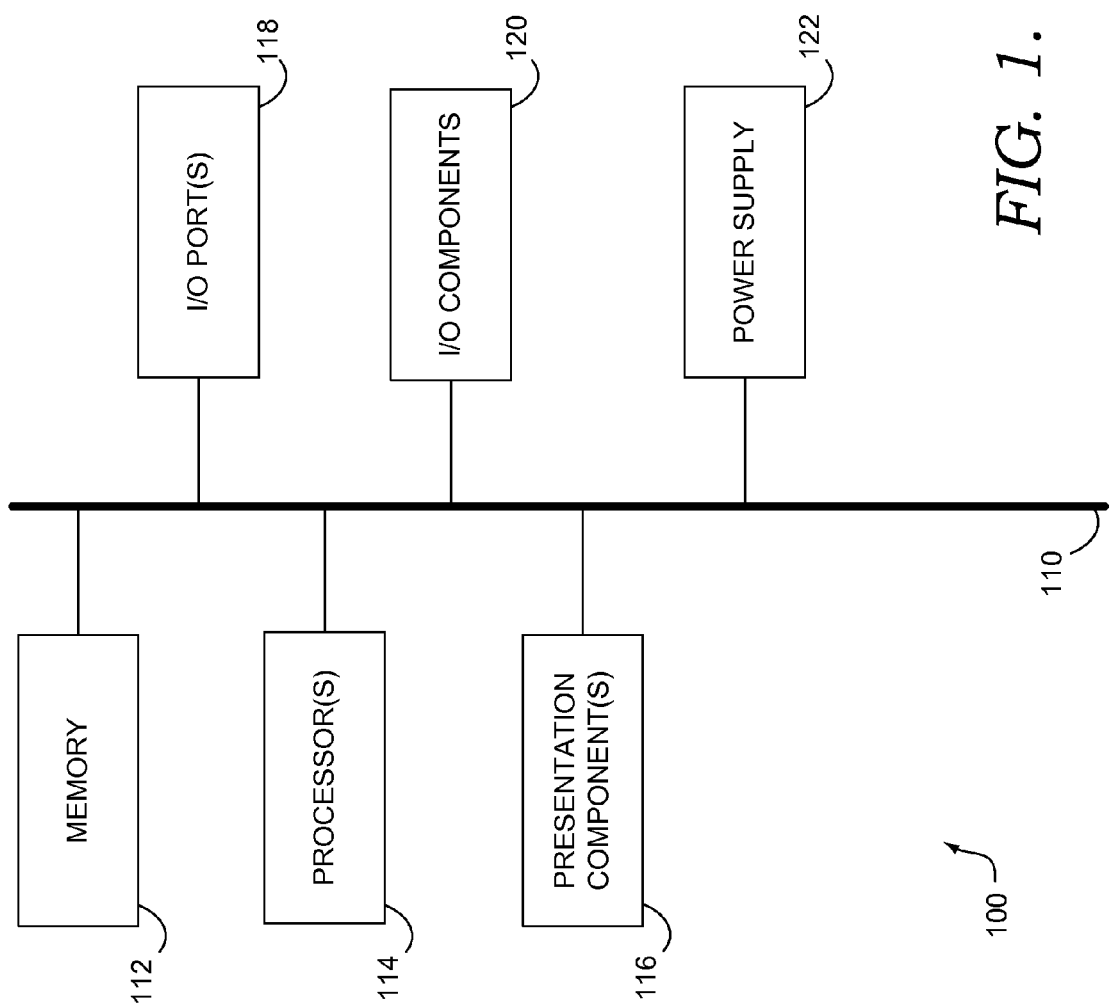
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer-storage media for suppressing a Short Message Service (SMS) induced Denial of Service (DoS) attack on a telecommunications network. A register receives a target device identifier that is associated with an SMS message. The register requests a location of the target device from a Home Location Register. The location of the target device is received. The register is updated to reflect the location of the target device. The quantity of SMS messages requested to be communicated within a predefined time period is determined to identify an SMS induced DoS attack. Upon determining that the quantity of SMS messages requested exceeds a predefined threshold, a trigger is communicated to an SMS router to enable a DoS mode. The DoS mode restricts communication of SMS messages to suppress the detected DoS attack.

Accordingly, in one aspect, the present invention provides a method for suppressing a Short Message Service (SMS) induced Denial of Service (DoS) attack on a telecommunications network. The method includes receiving at a register a target device identifier and an originating source identifier associated with an SMS message. The method also includes requesting, from the register, a location of a target device associated with the target device identifier. The method also includes receiving at the register, the location of the target device and updating the register to include the location of the target device. The method additionally includes determining a quantity of SMS message requests within a predefined time frame and communicating a trigger to an SMS router to enter into a DoS mode. The trigger is communicated because the determined quantity of SMS message requests exceed a predefined SMS request threshold.

In another aspect, the present invention provides a computer-storage media having computer-executable instructions embodied thereon for performing a method for suppressing an SMS induced DoS attack on a telecommunications network. The media includes receiving at an SMS router an SMS message from an originating source. The SMS message includes delivery information. The media also includes communicating, from the SMS router, the delivery information to a register and receiving from the register a DoS mode trigger. The media additionally includes enabling a DoS mode. The DoS mode allows the SMS router to restrict communication of SMS messages by way of the SMS router.

A third aspect of the present invention provides a system for suppressing an SMS induced DoS attack on a telecommunications network. The system includes an SMS router that operates in a DoS mode upon receiving a trigger. The system also includes at least one computing device that operates with at least one processor and at least one computer-storage media. The at least one computing device communicates with a register that maintains delivery data associated with one or more SMS messages communicated by way of the SMS router. The at least one computing device communicates the trigger upon determining the SMS router is to operate in the DoS mode. The system additionally includes a Home Location Register (HLR) that provides mobile device information of one or more mobile devices to the at least one computing device, wherein the mobile device information is utilized by the at least one computing device to populate at least a portion of the data maintained in the register.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
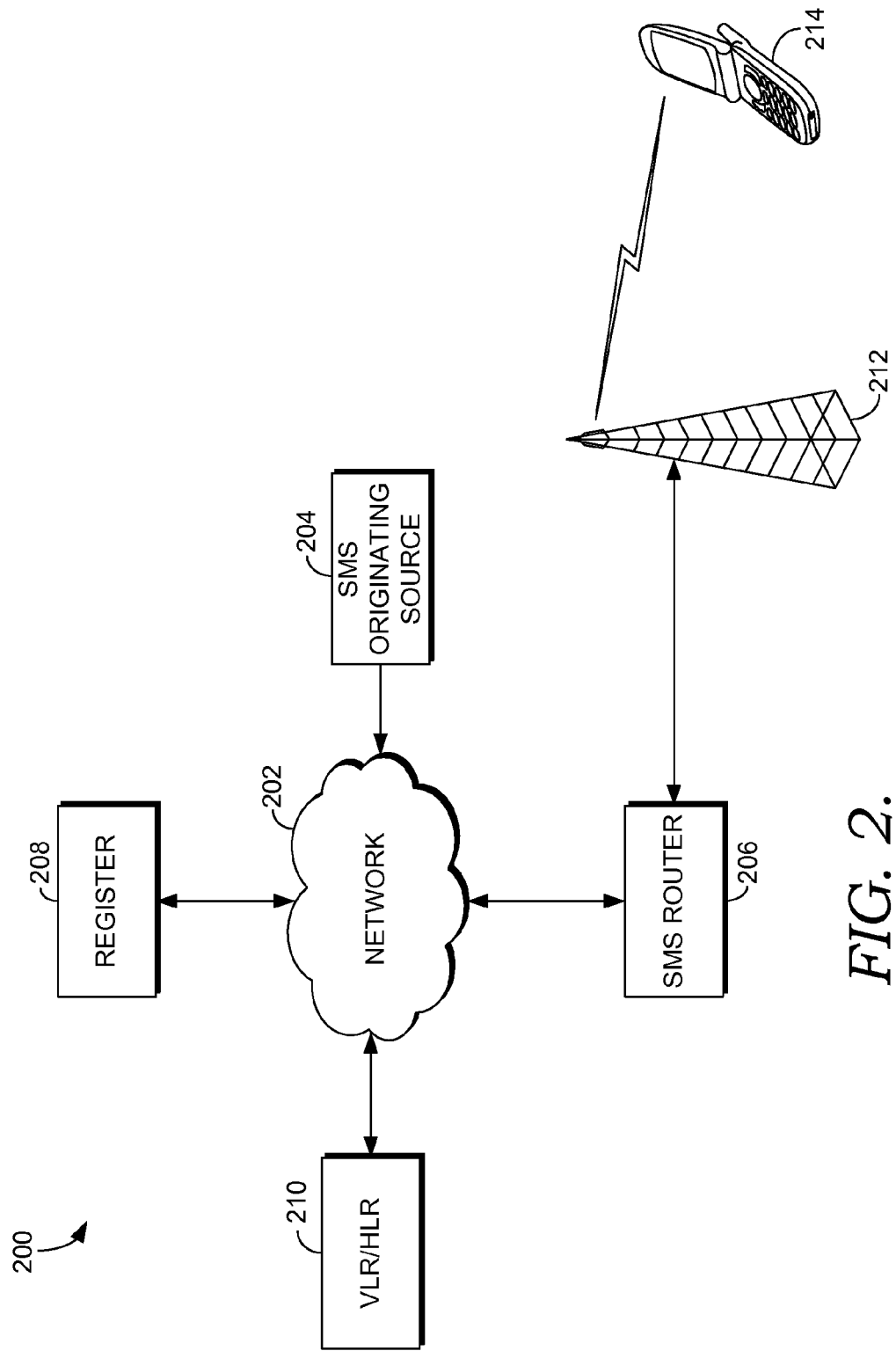
FIG. 2 depicts an environment for suppressing an SMS induced DoS attack on a telecommunications network suitable for implementing embodiments of the present invention.

With reference to FIG. 2 that depicts an exemplary environment for suppressing an SMS induced DoS attack on a telecommunications network suitable for implementing embodiments of the present invention is shown and designated generally as suppression environment 200. The suppression environment 200 is but one environment that is suitable for implementing embodiments of the present invention and is not intended to suggest a limitation as to the scope of use, functionality, or design of the present application. Neither should suppression environment 200 be interpreted as having any dependency or requirement relating to any one or combination of modules/components illustrated.

A network 202 facilitates communication among one or more components of the suppression environment 200. In an exemplary embodiment, network 202 is an Internet Protocol (IP) based network, which is a computing network that utilizes IP protocol as a network layer protocol. The network may include, without limitation, one or more local networks (LANs), and/or wide area networks (WANs). Such networking environments are commonplace in offices, enterprise-wide computer networks, intranets, and the Internet. Network 202, in an exemplary embodiment, includes several networks that communicate with one another to allow communication across the multiple networks in a seamless manner.

An SMS originating source 204 is a source of an SMS message request. In an exemplary embodiment, the SMS originating source 204 is a computing device, such as computing device 100 previously discussed with respect to FIG. 1. For example, the SMS originating source 204 may be a computing device, such as a personal computer, a server, a mobile communications device, and/or a user interface accessible by way of the Internet or an intranet. In an exemplary embodiment, the SMS originating source 204 is an Emergency Alert Services (EAS) which may include a collection of computing devices that are utilized to send a large quantity of SMS compatible messages to recipients in order to provide an alert that is traditionally associated with an emergency situation.

The SMS originating source 204, in an exemplary embodiment, includes a plurality of sources that are all associated by a common element. For example, the common element may be a similar SMS message, a similar originating IP address, a similar domain, a similar controlling entity, a similar originating identifier, a similar target device identifier, and/or a similar geographic target area. Additionally, the SMS originating source 204, in an exemplary embodiment, is an automated computing device that generates SMS messages based on rules or a predefined criteria for determining the target device. For example, the rules may dictate that all phone numbers or other target device identifiers known to be associated with a common wireless telecommunication network within a defined area have an SMS message communicated to those numbers. The communications devices may be identified by an area code and the following three digits that are known to be associated with a common telecommunications provider. This will effectively allow an automated computing device to communicate a large number of SMS messages to a potentially concentrated geographical area, without actually having information as to what the SMS message is communicating.

An SMS router 206 is a computing device whose software and/or hardware is tailored to the tasks of routing and forwarding SMS compatible information. In an exemplary embodiment, the SMS router 206 routes SMS messages from the SMS originating source 204 to a target device by way of one or more networks, such as network 202. In an exemplary embodiment, the SMS router 206 is capable of determining an originating source identifier and a target device identifier associated with an SMS message that is routed by way of the SMS router 206.

Additionally, the SMS router 206 is capable of limiting and or throttling SMS messages that are communicated by way of the SMS router 206. Throttling of SMS messages includes preventing a predefined quantity/capacity of SMS messages from being communicated over a time period. For example, the SMS router 206 may limit the number of SMS messages that are requested to be communicated by way of the SMS router 206 such that only a certain percentage of the SMS router or other elements of a wirelesses telecommunications network are utilized for SMS message communication.

The exemplary suppression environment 200 includes a register 208. The register 208 is a registration of target devices associated with a telecommunications network. In an exemplary embodiment, the register 208 includes information pertaining to the target devices that are associated with a particular telecommunications network, the location of the target devices, the quantity of SMS compatible messages requested to be communicated by way of the telecommunications network, the time associated with the requested SMS messages, and the geographic location associated with the target devices associated with the SMS messages. In an exemplary embodiment, the location of the target device can be identified with respect to a transceiver, a Base Station, a Node B, a sector of the transceiver, and/or geographic coordinates associated with the target device.

The register 208, in an exemplary embodiment, includes a computing device, such as computing device 100 discussed with respect to FIG. 1. For example, the register 208 includes a processor and memory capable of utilizing the information of the register to determine if a DoS mode trigger should be communicated to the SMS router 206. In an exemplary embodiment, the register 208 is coupled with the SMS router 206 such that the register 208 is a data store of the SMS router 206. In an alternative exemplary embodiment, the register 208 is coupled with a Home Location Register of a wireless telecommunications network.

A Visiting Location Register/Home Location Register (HLR/VLR) 210 is utilized, in part, to provide the location of a target device. In an exemplary embodiment, the HLR stores details of every Subscriber Identity Module (SIM) card associated with each mobile communications device that is associated with one or more wireless telecommunication providers served by the HLR. Each SIM or SIM card has a unique identifier called an (International Mobile Subscriber Identity) IMSI which is utilized as a primary key to each HLR record.

In an exemplary embodiment, a VLR is a temporary database of the target devices that have moved into a particular area that is served by the VLR. Each transceiver in a wireless telecommunications network is typically served by one VLR. Therefore, a target device cannot be present in more than one VLR at a time. Data that is stored in the VLR can include the target device's IMSI, Mobile Station International Subscriber Directory Number (MSISDN) (also referred to herein as a Mobile Subscriber Integrated Services Digital Network Number (MSISDNN)), the HLR of the target device, and other information useable to identify a target device and its location. MSISDNs, are the telephone numbers used by mobile communication devices to make and receive calls. The primary MSISDN of a mobile communications device is the number used for making and receiving voice calls and SMS, but it is possible for a SIM to have other secondary MSISDNs associated with it for fax and data calls. Each MSISDN is also a primary key to the HLR record in an exemplary embodiment. Examples of information maintained by a VLR include, but are not limited to, an International Mobile Equipment Identity (IMEI), an Electronic Serial Number (ESN), an IP address, and a Media Access Control (MAC) address.

In an exemplary embodiment, the HLR/VLR 210 is a registry that maintains information typically maintained by an HLR. In an additional exemplary embodiment, the HLR/VLR 210 is a registry that maintains information that is typically maintained by a VLR. In an additional exemplary embodiment, the HLR/VLR 210 is a registry that maintains information that is typically retrieved from an HLR and a VLR when identifying a mobile device. For example, the HLR/VLR 210 is utilized to provide the current location of a target device to which an SMS message is requested to be communicated. In an exemplary embodiment, the HLR/VLR 210 is the combination of an HLR and a VLR that communicate by way of a network, such as network 202, where the HLR and VLR are physically separate components that are utilized in combination to provide information to the register 208.

The suppression environment 200 includes a wireless network 212. The wireless network 212, in an exemplary embodiment, is a wireless communications network which includes wireless telecommunications networks. A wireless communications network refers to any type network that includes wireless technologies. Examples of wireless technologies that are compatible with wireless network 212 include, but are not limited to, wireless technologies in the Third Generation Partnership Project (3GPP), the Third Generation Partnership Project 2 (3GPP2), IEEE 802.16 (e.g., WirelessMAN), and IEEE 802.11 (e.g., WiFi).

3GPP covers, among other technologies, General Packet Radio Service (GPRS), Enhanced Data rates for GSM Evolution (EDGE), and W-CDMA specifications to name a few. 3GPP2 covers, among other technologies, Code Division Multiplexing (CDMA) 2000 as an example.

The wireless network 212 facilitates communication between one or more mobile communication devices, computing devices, communication devices, and SMS originating sources 204. In an exemplary embodiment, the wireless network 212 is coupled, either directly or indirectly to the SMS router 206 to facilitate communication of SMS messages from the SMS originating source 204 to a mobile communications device 214.

A mobile communications device 214 is a device that is capable of communicating by way of the wireless network 212. In an exemplary embodiment, the mobile communications device 214 is useable to receive and/or send SMS messages. For example, the mobile communications device 214 includes, but is not limited to, wireless phones, cellular phones, smart phones, personal data assistants, mobile computing devices, and other computing devices that are capable of communicating by way of the wireless network 212. A target device, in an exemplary embodiment is the mobile communications device 214.

FIG. 2 is not meant to limit the association and/or relationship of the one or more components depicted as part of the suppression environment 200. Instead, it is understood by those with ordinary skill in the art that the components, such as the SMS router 206, the register 208, and the HLR/VLR 210 are associated with the wireless network 212 in an exemplary embodiment. FIG. 2 is merely for illustrative purposes and it should be understood that the interaction among the various components, including the network 202 and the wireless network 212, is not defined, but instead may vary in order to facilitate the suppression of SMS induced DoS attacks. For example, the SMS router 206 and the register 208 and the HLR/VLR 210, in an exemplary embodiment, are part of the wireless network 212. Continuing with this example, the SMS originating source 204 communicates a request to communicate an SMS message by way of the network 202. The SMS message request is communicated to the wireless network 212 which in turn directs the SMS message request to the SMS router 206. Additional exemplary embodiments include the SMS originating source 204 communicating by way of the wireless network 212 (not shown).

Figure 3:
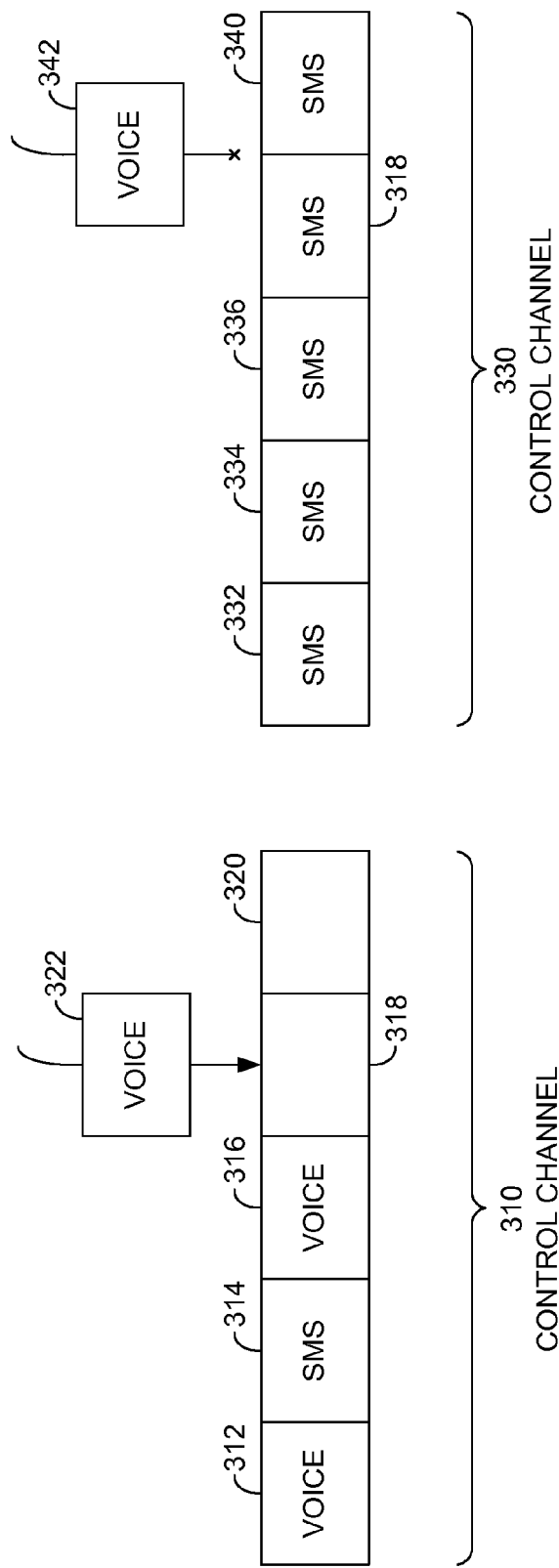
FIG. 3 depicts a control channel utilized for paging a mobile communications device in accordance with an embodiment of the present invention.

Turning now to FIG. 3, a block diagram visually depicts a control channel utilized for paging a mobile communications device. A visual depiction of a control channel 310 is provided to facilitate understanding of how an SMS message is capable of inducing a DoS attack. In an exemplary embodiment, a control channel is a portion of the spectrum utilized by a wireless network to communicate with a wireless communications device. The control channel can be utilized to communicate call setup, SMS messaging, and network information to and from mobile communication devices. In addition to control channels, the mobile communications devices typically utilize a traffic channel to communicate a voice conversation. Therefore, the control channel, in an exemplary embodiment, is utilized to page and establish a voice call that is eventually carried over a traffic channel.

The control channel is utilized, in an exemplary embodiment, for both SMS messaging and establishing voice calls. If a significant number of SMS messages are communicated at a particular time, then the control channel can be filled to capacity such that a voice call cannot utilize the control channel to establish a voice call or other type of communication. The control channel 310 visually depicts a typical utilization of a control channel by a wireless network. For purposes of explanation only, the depicted control channel 310 includes capacity for five requests at any given time period. The capacity is visually depicted as blocks 312-320. This example shows a voice call setup utilizing block 312, an SMS message utilizing block 314, and a voice call setup utilizing block 316 of the control channel 310. The control channel 310 is able to facilitate an additional two requests as indicated by blocks 318 and 320. Therefore, when a voice call setup 322 is communicated, the wireless network is able to utilize block 318 to facilitate communication of that request.

However, if a control channel is utilized to its capacity at a given time, then additional requests cannot be communicated to a target device resulting in dropped requests or service complications. A control channel 330 visually depicts a control channel that is at capacity as a result of an SMS induced DoS attack. In such a situation, the control channel 330 cannot facilitate communication of additional requests as depicted by blocks 332-340. The blocks 332-340 are filled with SMS messages and therefore the control channel 330 does not have sufficient capacity to handle a voice call setup 342 that has been requested.

As a result of the control channel 330, an SMS induced DoS attack is created by one or more SMS originating sources attempting to communicate a number of SMS messages. If the control channel is communicating the SMS messages from the one or more SMS originating sources, then the control channel does not have the ability to communicate a voice call setup request. The control channel is functioning at capacity. As a result, SMS messages are effective at filling a control channel to capacity because they can be automatically generated in significant quantities with a minimal expenditure of resources. For example, in an attempt to fill a control channel to capacity a computing device may be employed to automatically generate and send a large quantity of SMS messages to a group of mobile devices that are utilizing a common control channel. In order to target mobile devices utilizing a common control channel, the computing device may identify mobile devices that are located in a common sector of a transceiver through location identifying or speculating information. The SMS messages are communicated to an SMS router that then forwards the SMS messages to the appropriate components of the wireless telecommunications network in an attempt to deliver the SMS messages. But, when an attempt to communicate all of the SMS messages by a transceiver over a control channel to the plurality of mobile communications devices occurs at a similar time, the control channel becomes congested and is unable to communicate other requests, such as voice call setup requests. Therefore, the wireless network, at least in the area covered by the congested control channel, becomes ineffective and unreliable for communicating other requests, such as voice call setup requests.

Figure 4:
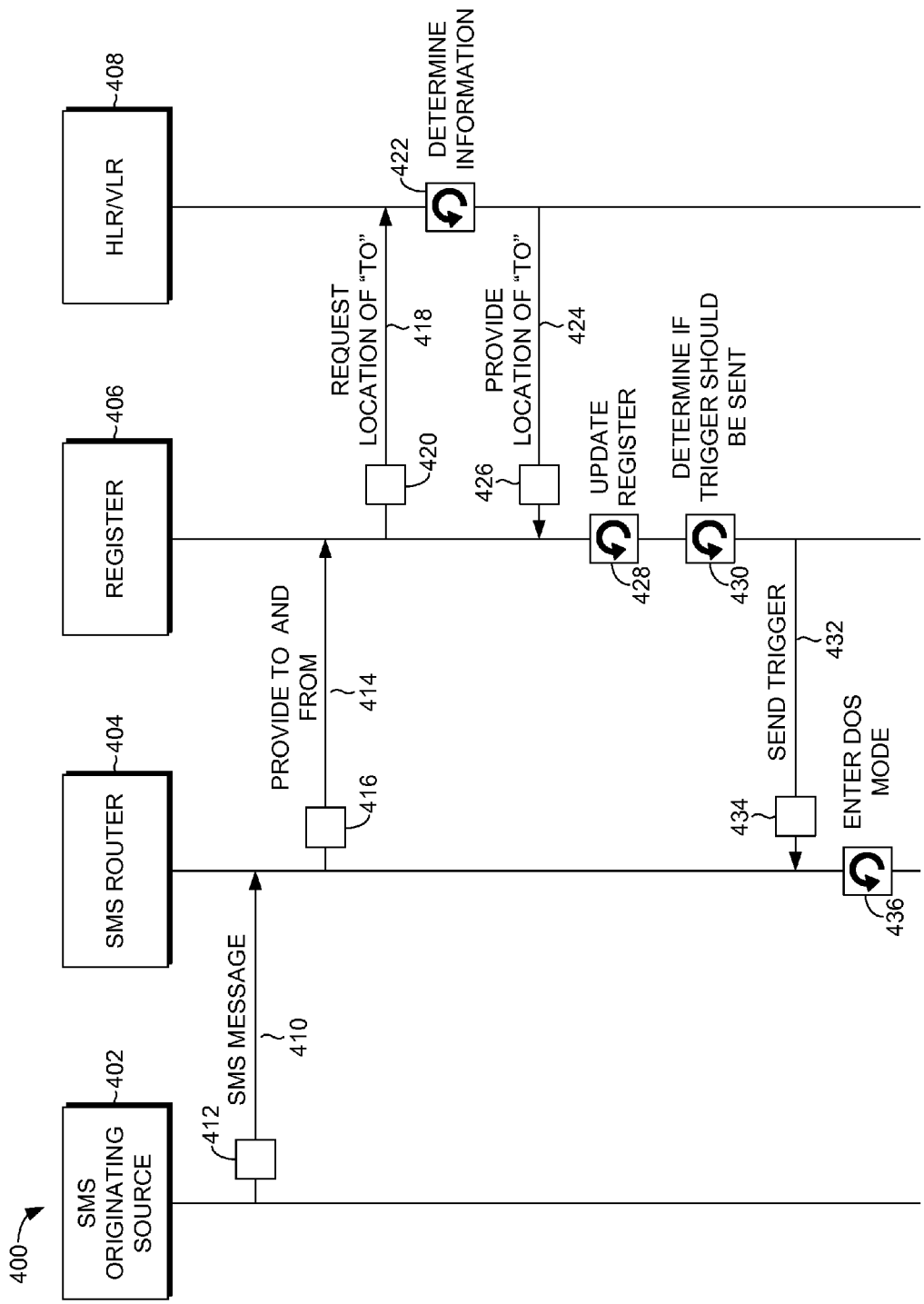
FIG. 4 depicts a flow diagram of a information flow to suppress an SMS induced DoS attack on a wireless telecommunications network in accordance with an embodiment of the present invention.

FIG. 4 is a flow diagram that depicts an exemplary flow to suppress an SMS induced DoS attack on a wireless telecommunications network, as generally depicted by numeral 400. An SMS originating source 402 is similar to the previously discussed SMS originating source 204 of FIG. 2. An SMS router 404 is similar to the previously discussed SMS router 206 of FIG. 2. A register 406 is similar to the register 208 discussed with respect to FIG. 2. An HLR/VLR 408 is similar to the HLR/VLR 210 previously discussed with respect to FIG. 2.

The flow diagram includes communicating at 410 an SMS message 412 from the SMS originating source 402 to the SMS router 404. The communication of the SMS message 412, in an exemplary embodiment, is by way of a network, such as network 202 in combination with wireless network 212. The SMS router 404 identifies information associated with the SMS message 412, such as an originating source identifier and a target device identifier. Additional information, in an exemplary embodiment, is extracted from the SMS message 412, which includes the time of the SMS message request, the content of the SMS message request, the priority level associated with the SMS message, and other information that can be utilized to identify the SMS message 412 as being associated with a DoS attack. A priority level associated with the SMS message can be based on a subscription level of the SMS originating source or the target device, such that SMS messages with a predefined priority level are treated differently by the DoS mode. The subscription level is a level of service priority granted to an entity utilizing a service provider network. The level of service priority provides varied exceptions to a DOS mode of the SMS router 206. For example, an EAS may be provided a priority level, that allows EAS messages to be communicated by the SMS router 206 even if the SMS router 206 is operating in a DoS mode.

The SMS router 404 communicates at 414 the information 416, such as the target device identifier, which is a "to" identifier, and the originating source identifier, which is a "from" identifier of the SMS message 412 to the register 406. Additionally, in an exemplary embodiment, the information 416 includes the additional information previously identified with the SMS message 412. The register 406 receives the information 416 and requests at 418 additional information 420 from the HLR/VLR 408. The additional information 420, in an exemplary embodiment, includes location information of the target device associated with the SMS message 412. As previously discussed, the location of the target device is determined through the use of an HLR and/or a VLR based on one or more unique identifiers associated with the target device. For example, the SMS message 412 includes a MSISDN of the target device, where the MSISDN is associated with a particular SIM card of a mobile communications device that is monitored by the HLR/VLR 408. As a result, the HLR/VLR 408 is functional to determine the location of the mobile communications device associated with the MSISDN of the SMS messages 412.

The HLR/VLR 408 receives the request for additional information 420 and determines at 422 the additional information 420 requested. For example, the HLR/VLR 408 queries a register of an HLR associated with the target device identified in the SMS message 412 to determine the location of the target device. The HLR/VLR 408 communicates at 424 the determined additional information 426 to the register 406. As a result, the register 406 updates at 428 to reflect the determined additional information 426. For example, the determined additional information 426 includes the transceiver and sector currently serving the target device associated with the SMS message 412. The update at 428, in an exemplary embodiment, includes updating the register 406 with information 416, such as the time of the SMS message 412 and the originating source identifier associated with the SMS message 412.

The register 406 determines at 430 if a trigger should be communicated to the SMS router 404. The determination at 430, in an exemplary embodiment, evaluates the number of SMS messages being requested to be communicated with one or more target devices that are located such that a common control channel will be utilized to facilitate the communication of the SMS messages. The register 406 determines to communicate a trigger if an SMS induced DoS attack is suspected based on the potential congestion of a control channel of a wireless communications network. For example, predefined rules may be utilized that limit the quantity of SMS messages that can be communicated to a particular transceiver within a sliding time period. The quantity may be identified by a number of messages or by a percentage of capacity of one or more control channels. In an exemplary embodiment, the predefined rules are defined for a particular transceiver, Node B, Base Station, sector, and geographic location. Or, the predefined rules are applied across the wireless communications network. For example, different rules may be applied for a congested metropolitan area versus a rural area, where the rural area has a different capacity and fewer potential target devices.

The predefined rules, in an exemplary embodiment, are able to identify originating sources that are allowed to send a quantity of SMS messages that would normally be determined to be an SMS induced DoS attack. For example, an EAS that sends emergency SMS message alerts to students of a particular college campus sends a large number of SMS messages within a short time period. The register 406 can, in this exemplary embodiment, identify that the originating source is an authorized entity and therefore determine that a trigger should not be communicated to the SMS router.

The register 406 communicates at 432 a trigger 434 to the SMS router 404. The trigger 434 causes the SMS router 404 to enable at 436 a DoS mode. The trigger 434, in an exemplary embodiment, provides an indication that the SMS router 404 is to enter into a DoS mode. Alternatively, the trigger 434 includes specific instruction for enabling the DoS mode. For example, the trigger 434, in an exemplary embodiment, includes information on the type of DoS mode the SMS router is to enable, such as a throttling mode, a complete prevention mode, a focused mode, or combinations thereof. A throttling mode limits the quantity of SMS messages that are communicated during a time period. The quantity may be defined by a percentage of capacity or a fixed number of messages. For example, a Short Message Service Center (SMSC) is utilized to queue, for later communication, those SMS messages delayed from being communicated as a result of a throttling DoS mode of the SMS router. A complete prevention mode prevents all SMS messages from being communicated. A focused mode identifies particular SMS messages that should be either throttled or prevented. For example, the trigger 434 can indicate an originating source identifier that should be throttled, a geographic location that should be throttled, a target device that should be throttled, or specific SMS messages containing particular content that should be throttled. All modes can either queue SMS messages for later communication or drop those messages affected by the DoS mode.

While the exemplary suppression of SMS induced DoS attack flow 400 discusses the SMS router 404 as the component that enables a DoS mode, other components of the wireless telecommunications network are viable alternatives. For example, a DoS mode, in an exemplary embodiment, is enabled at a transceiver of the wireless network or an SMSC of the wireless telecommunications network. Therefore, the DoS mode is not limited to the SMS router 404, but instead may be utilized by one or more components of a wireless telecommunications network.

FIG. 5 depicts an exemplary method of suppressing a Short Message Service induced Denial of Service attack on a telecommunications network as generally indicated by numeral 500. At a step 502, the network 202 receives an SMS message from the SMS originating source 204. Information associated with the SMS message is identified by a computing device coupled to the network 202. For example, the SMS router 206 identifies the information associated with the SMS messages. The information includes a target device identifier, an originating source identifier, and the time associated with the SMS message. The information of the SMS message, in an exemplary embodiment, is identified by a computing device whose functionality includes specific functionality to identify the desired information and provide the information to the register 208.

At a step 504, the register 208 receives the target device identifier associated with the SMS message. At a step 506, the register 208 receives an originating source identifier associated with the SMS message. The register 208, in an exemplary embodiment, queries an associated data store to determine if the target device identifier and/or the originating source identifier are included in the data store. Continuing with this example, if the target device identifier is included in the data store, the register can utilize the information associated with the target device identifier as opposed to re-requesting such information. But, if the target device identifier is not included in the data store, or the information has expired, the register 208 requests information associated with the target device identifier.

In an exemplary embodiment, the target device identifier associated with the SMS message is not the same target device identifier that is utilized to determine the location of the target device. For example, if the target device identifier associated with the SMS message is a MSISDNN, but an IMSI is utilized by an HLR to determine the location of the target device, a translation is automatically done within the wireless telecommunications network. In an exemplary embodiment, that translation is done by the HLR, but the translation is not limited to the HLR.

At a step 508, the register 208 requests a location of a target device associated with the target device identifier identified from the SMS message. The register 208 communicates the request to the HLR/VLR 210. A translation of the target device identifier, in an exemplary embodiment, is performed to request the location information of the associated target device. The location information is utilized to determine if a particular control channel associated with a geographic location will be utilized to communicate the SMS message. In an exemplary embodiment, the location information provided by the HLR/VLR 210 is utilized to determine if an SMS induced DoS attack should be suppressed.

At a step 510, the register 208 receives the location information of the target device. As previously discussed, the location information, in an exemplary embodiment, is defined by an associated transceiver, Node B, Base Station, sector, and/or coordinates of the target device.

At a step 512, the register 208 updates an associated data store to include information relevant to the SMS message. For example, the originating source identifier, target device identifier, target device location, and the time of the SMS message are updated in the register 208. The register 208, in an exemplary embodiment, includes information relevant to SMS messages communicated within a time period. For example, the register 208 will purge expired information that is associated with SMS messages older than a predefined age. For example, information associated with SMS messages that were communicated over about one hour prior are therefore purged as that information is not useable, in an exemplary embodiment, for determining if an SMS induced DoS attack is to be suppressed. The time period can be defined in ranges from seconds prior to the current time to days prior to the present time.

At a step 514, the register 208 determines the number of SMS messages requested within a predefined time frame. For example, the register 208 will utilize one or more predefined rules, as previously discussed, to identify an appropriate time frame for a particular geographic location. In an exemplary embodiment, the time frame is a sliding window of time, such that the time frame includes the previous "X" time, where X is determined from the predefined rules. In an exemplary embodiment, the X will include the last few seconds all of the way to the last few hours. But, in an exemplary embodiment, the X will be defined by seconds or minutes. Additionally, the determination of the number of SMS messages within a predefined time frame, in an exemplary embodiment, is based on a location. Therefore, in this exemplary embodiment, the quantity of SMS messages within a predefined time frame that are requested to be communicated to a particular location are determined.

At a step 516, the register 208 communicates a trigger to the SMS router 206. The trigger indicates that the SMS router 206 is to enter into a DoS mode. In an exemplary embodiment, the register 208 communicates the trigger because the determined quantity of SMS messages from step 514 exceeds a predefined SMS request threshold. In an exemplary embodiment, the SMS request threshold is determined by the predefined rules previously discussed. For example, the SMS request threshold is lower in a metropolitan area as a result of a greater demand on a control channel capacity at any given time as compared to a higher SMS request threshold for a rural area. In an additional exemplary embodiment, the predefined SMS request threshold is a fixed quantity that is not dependent on predefined rules. Additionally, the trigger communicated in step 516, in an exemplary embodiment, includes additional information that allows for a defined DoS mode to be enabled and information indicating how to enable the defined DoS mode. For example, the trigger can indicate that a focused DoS mode is to be enabled such that only SMS messages directed to a particular location should be throttled, while all other SMS messages should be communicated without restriction of the DoS mode.

At a step 518, the register 208 communicates an additional trigger. In an exemplary embodiment, the additional trigger instructs the SMS router 206 to disable the DoS mode. For example, the trigger communicated at step 514 does not include an expiration; therefore, the SMS router 206 will maintain the DoS mode until instructed to disable the DoS mode. As a result, when the register 208 determines that the DoS mode is no longer necessary to suppress an SMS induced DoS attack, an additional trigger, a release trigger is communicated to disable the DoS mode. In an alternative embodiment, the additional trigger instructs the SMS router 206 to enable the DoS mode for an extended period of time. For example, the trigger communicated at step 516, in an exemplary embodiment, includes an expiration time, wherein the DoS mode is set to disable after a predefined time period. The additional trigger communicated at step 518 renews the DoS mode when the register 208 determines that the DoS mode should continue to be enabled.

FIG. 6 depicts an exemplary method of suppressing a Short Message Service induced Denial of Service attack on a telecommunications network as generally indicated by numeral 600. At a step 602, the SMS router 206 receives an SMS message from the SMS originating source 204. In an exemplary embodiment, the SMS originating source 204 communicates by way of network 202 and/or wireless network 212. The SMS message includes delivery information, such as a target device identifier. For example, the SMS message is communicated to a phone number utilized by a wireless communications device, therefore, the SMS message includes the phone number, which is an identifier of the target device. Additionally, the deliver information, in an exemplary embodiment, includes a priority level, an identifier of the target device, and a time of the SMS message.

At a step 604, the SMS router 206 communicates the delivery information to the register 208. In an exemplary embodiment, the register 208 receives the delivery information associated with the SMS message from the SMS router 206 by way of the network 202 and/or wireless network 212. Additionally, in an exemplary embodiment, the register 208 updates an associated data store after receiving additional information relevant to the SMS message, such as the location of the target device. The register 208, in an exemplary embodiment, determines if an SMS induced DoS attack should be suppressed. The register 208 communicates a trigger to the SMS router 206 when it has been determined that an SMS induced DoS attack should be suppressed.

At a step 606, the SMS router 206 receives the DoS mode trigger communicated from the register 208. The DoS mode trigger indicates that the SMS router 206 is to enter into a DoS mode to suppress an SMS induced DoS attack. At a step 608, the SMS router enables a DoS mode. The DoS mode allows the SMS router to restrict, such as by throttling, the communication of SMS messages.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for suppressing a Short Message Service (SMS) induced Denial of Service (DOS) attack on a telecommunications network, the method comprising:
   receiving at a register information associated with an SMS message, wherein the information is received from an SMS router that extracted the information from the SMS message, and wherein the information includes a target device identifier of a target device, an originating source identifier, a time of the SMS message, and a priority level associated with the SMS message;
   sending a request from the register to a home location register (HLR) or a visiting location register (VLR) for location information indicating a location of the target device, wherein the location information is associated with a geographic area;
   receiving at the register, the location information from the HLR or VLR;
   updating the register to include the location information of the target device, wherein the register tracks information pertaining to the target device, a quantity of requests for SMS messages to be delivered to the target device, a time associated with the SMS messages, and the location information;
   at the register, utilizing the information extracted from the SMS message and the location information to determine whether a DoS attack is occurring, wherein determining whether the DoS attack is occurring includes determining whether the quantity of requests for SMS messages to be communicated to the geographic area within a predefined time frame exceeds a predefined SMS request threshold based on a capacity of a control channel that would be utilized to facilitate communication of the SMS messages;
   in response to determining that DoS attack is occurring, the register communicating a trigger to the SMS router to enter into a DoS mode, wherein the DoS mode is one of a plurality of types of DoS mode that include
   (A) a throttling mode that limits a quantity of SMS messages that are communicated during a time period,
   (B) a complete prevention mode that prevents all SMS messages from being communicated, and
   (C) a focused mode that identifies particular SMS messages that should be either throttled or prevented;
   at the SMS router, enabling a DoS mode in response to receiving the DoS mode trigger from the register, wherein the DoS mode allows the SMS router to restrict communication of SMS messages by operating the SMS router in the throttling mode, the complete prevention mode, or the focused mode; and
   communicating an additional trigger to the SMS router to instruct the SMS router to disable the DoS mode or to maintain the DoS mode for an extended period of time; wherein the additional trigger to instruct the SMS router to disable the DoS mode is in response to a determination that the quantity of requests for SMS messages is below a second SMS request threshold.

2. The method of claim 1, wherein the telecommunications network is compatible with a wireless technology wherein the wireless technology is selected from a group including wireless technologies in the Third Generation Partnership Project (3GPP), Third Generation Partnership Project 2 (3GPP2), IEEE 802.16, and IEEE 802.11.

3. The method of claim 1, wherein the target device is a mobile communications device.

4. The method of claim 1, wherein the originating source identifier or the target device identifier is compatible with one from the following list:
   (A) International Mobile Equipment Identity (IMEI);
   (B) Mobile Subscriber Integrated Services Digital Network Number (MSISDNN);
   (C) International Mobile Subscriber Identity (IMSI);
   (D) Electronic Serial Number (ESN);
   (E) Internet Protocol (IP) address;
   (F) Media Access Control (MAC) address; and
   (G) Phone Number.

5. The method of claim 1, wherein the location is described by at least one from the following:
   (A) Sector;
   (B) Base Station;
   (C) Node B;
   (D) Transceiver; or
   (E) Geographic Coordinates.

6. The method of claim 1 further comprising communicating a second trigger to the SMS router because the determined quantity of SMS message requests exceeds a predefined SMS request threshold for a predefined time period.

7. One or more nontransitory computer-readable media having computer-executable instructions embodied thereon for performing a method for suppressing a Short Message Service (SMS) induced Denial of Service (DOS) attack on a telecommunications network, the method comprising:
   receiving at an SMS router an SMS message from an originating source, wherein the SMS message includes delivery information containing a target device identifier of a target device, an originating source identifier, a time of the SMS message, and a priority level associated with the SMS message;
   extracting the delivery information from the SMS message;
   communicating, from the SMS router, the extracted delivery information to a register, wherein the register tracks information pertaining to target devices that are associated with the telecommunications network,
      a quantity of requests for SMS messages to be communicated by way of the telecommunications network to each target device,
      a time associated with the requests, and
      location information indicating a location of each target device associated with the SMS messages, wherein the location information is associated with a geographical area,
   wherein upon receiving the extracted delivery information from the SMS router, the register requests and receives from a home location register (HLR) or a visiting location register (VLR), the location information indicating the location of the target device identified by the target device identifier, determines whether to communicate a DoS mode trigger to the SMS router based on determining whether a DoS attack is occurring, wherein determining whether the DoS attack is occurring includes determining whether the quantity of requests for SMS messages to be communicated to the geographic area within a predefined time frame exceeds a predefined SMS request threshold based on a capacity of a control channel that would be utilized to facilitate communication of SMS messages, and when an SMS induced DoS attack is suspected based on a potential congestion of the common control channel, then sending the DoS mode trigger to the SMS router;

at the SMS router, receiving from the register the DoS mode trigger that specifies a type of DoS mode in which the SMS router is to operate, wherein types of DoS mode include
(A) a throttling mode that limits a quantity of SMS messages that are communicated during a time period,
(B) a complete prevention mode that prevents all SMS messages from being communicated, and
(C) a focused mode that identifies particular SMS messages that should be either throttled or prevented;

at the SMS router, enabling a DoS mode in response to receiving the DoS mode trigger from the register, wherein the DoS mode allows the SMS router to restrict communication of SMS messages by operating the SMS router in the throttling mode, the complete prevention mode, or the focused mode; and receiving, at the SMS router, an additional trigger from the register instructing the SMS router to disable the DoS mode or to maintain the DoS mode for an extended period of time, wherein the additional trigger to instruct the SMS router to disable the DoS mode is in response to a determination that quantity of requests for SMS messages to be communicated to the geographic area within the predefined time frame is below a second SMS request threshold.

8. The media of claim 7, wherein the telecommunications network is compatible with a wireless technology wherein the wireless technology is selected from a group including wireless technologies in the Third Generation Partnership Project (3GPP), Third Generation Partnership Project 2 (3GPP2), IEEE 802.16, and IEEE 802.11.

9. The media of claim 7, wherein the originating source is at least one from the following:
(A) Mobile Communications Device;
(B) Computing Device;
(C) Alert Service; and
(D) User Interface for Communicating SMS Messages.

10. The media of claim 7, wherein the delivery information includes at least one from the following:
(A) Time of the request;
(B) Originating Source Identifier; or
(C) Priority Level.

11. The media of claim 7, wherein the register is a data table that is accessible by way of the telecommunications network.

12. The media of claim 11, wherein the register is associated with the SMS router by way of a communications pathway.

13. The media of claim 7, wherein the DoS mode trigger is received because a predefined quantity of SMS message requests were received by the SMS router within a predefined time frame.

14. The media of claim 13, wherein the predefined quantity of SMS message requests are from a common originating source.

15. The media of claim 7 wherein the DoS mode limits the communication from the SMS router of SMS message requests associated with one or more specified originating source identifiers.

16. The media of claim 15, wherein the DoS mode limits the communication includes preventing the communication of the SMS message request.

17. The media of claim 15, wherein the DoS mode limits the communication includes queuing the SMS message request to be communicated over a predefined time frame.

18. A system for suppressing a Short Message Service (SMS) induced Denial of Service (DoS) attack on a telecommunication network, the system comprising:
a plurality of SMS originating sources communicating SMS messages to target devices within the telecommunication network;
an SMS router;
a register computing device; and
a Home Location Register (HLR) or Visiting Location Register (VLR) that includes at least a processor;
wherein the SMS router further includes at least a first processor and a first memory storing computer executable instructions that, when executed by at least the first processor, cause at least the first processor to perform the steps of:
receiving, at the SMS router, an SMS message from an originating source, wherein the SMS message includes delivery information containing a target device identifier of a target device, an originating source identifier, a time of the SMS message, and a priority level associated with the SMS message,
extracting the delivery information from the SMS message, and
communicating the extracted delivery information to the at least one register computing device;
wherein the register computing device includes at least a second memory storing computer executable instructions that, when executed by at least one processor, cause the at least one processor to perform the steps of:
tracking information pertaining to target devices that are associated with the telecommunications network, tracking a quantity of SMS messages to be communicated by way of the telecommunications network to each target device, tracking a time associated with the SMS messages, and tracking location information indicating a location of each target device associated with the SMS messages, wherein the location information is associated with a geographical area,
wherein upon receiving the extracted delivery information from the SMS router, the register computing device requests and receives, from the HLR or VLR, the location information indicating the location of the target device identified by the target device identifier,
determining whether to communicate a DoS mode trigger to the SMS router based on determining whether a DoS attack is occurring, wherein determining whether the DoS attack is occurring includes determining whether the quantity of requests for SMS messages to be communicated to the geographic area within a predefined time frame exceeds a predefined SMS request threshold based on a capacity of a control channel that would be utilized to facilitate communication of the SMS messages, and when an SMS induced DoS attack is suspected based on a potential congestion of the common control channel, then sending the DoS mode trigger to the SMS router;

receiving, by the SMS router, the DoS mode trigger that specifies a type of DoS mode in which the SMS router is to operate, wherein types of DoS mode include (A) a throttling mode that limits a quantity of SMS messages that are communicated during a time period, (B) a complete prevention mode that prevents all SMS messages from being communicated, and (C) a focused mode that identifies particular SMS messages that should be either throttled or prevented;

enabling a DoS mode, at the SMS router, in response to receiving the DoS mode trigger, wherein the DoS mode allows the SMS router to restrict communication of SMS messages by operating the SMS router in the throttling mode, the complete prevention mode, or the focused mode; and receiving, from the register computing device, an additional trigger instructing the SMS router to disable the DoS mode or to maintain the DoS mode for an extended period of time; wherein the additional trigger to instruct the SMS router to disable the DoS mode is in response to a determination that quantity of SMS messages is below a second SMS request threshold.

* * * * *